US009326623B2

(12) United States Patent
Harwell et al.

(10) Patent No.: US 9,326,623 B2
(45) Date of Patent: May 3, 2016

(54) COMPUTER TABLET MOUNTING DEVICE AND ATTACHMENT TO POSTS OF A DISPLAY APPARATUS

(71) Applicant: Twine Labs, LLC, Perrysburg, OH (US)

(72) Inventors: Aaron C. Harwell, Perrysburg, OH (US); Jonathan R. Hawker, Perrysburg, OH (US); Joel Beebe, Columbus, OH (US); Christopher Hawker, Columbus, OH (US); Nick Vallo, New Albany, OH (US); John Vanderveen, Columbus, OH (US)

(73) Assignee: Twine Labs, LLC, Perrysburg, OH (US)

( * ) Notice: Subject to any disclaimer, the term of this patent is extended or adjusted under 35 U.S.C. 154(b) by 0 days.

(21) Appl. No.: 14/511,677

(22) Filed: Oct. 10, 2014

(65) Prior Publication Data

US 2015/0103245 A1 Apr. 16, 2015

Related U.S. Application Data

(60) Provisional application No. 61/889,576, filed on Oct. 11, 2013.

(51) Int. Cl.
*A47G 1/16* (2006.01)
*G09F 3/20* (2006.01)

(52) U.S. Cl.
CPC .............. *A47G 1/1653* (2013.01); *G09F 3/204* (2013.01)

(58) Field of Classification Search
CPC ..... A47B 96/068; A47G 1/1653; G09F 3/204
USPC .............. 108/50.15, 50.11; 248/475.1, 218.4, 248/220.21, 220.22; 40/606.08, 606.12, 40/607.01, 611.01, 611.05
See application file for complete search history.

(56) References Cited

U.S. PATENT DOCUMENTS

| | | | | |
|---|---|---|---|---|
| 1,033,838 A | * | 7/1912 | Smith | G09F 7/18 40/606.13 |
| 1,277,869 A | * | 9/1918 | Costley | G09F 7/18 40/606.02 |
| 2,675,983 A | * | 4/1954 | King | G09F 21/04 248/475.1 |
| 2,914,285 A | * | 11/1959 | Audette | B60R 13/105 224/501 |
| 2,935,281 A | * | 5/1960 | Huffman | B60R 13/105 248/475.1 |
| 4,633,788 A | * | 1/1987 | Robertson | G09F 23/06 108/108 |
| 5,042,766 A | * | 8/1991 | Baker | F16M 13/02 248/200.1 |
| 5,199,677 A | * | 4/1993 | Sessions | A01G 17/14 248/218.4 |
| 7,441,735 B2 | * | 10/2008 | Zhao | F16M 11/10 248/220.22 |
| 7,500,645 B1 | * | 3/2009 | McCubbins | E06C 7/14 248/210 |

(Continued)

*Primary Examiner* — Michael Safavi
(74) *Attorney, Agent, or Firm* — Fraser Clemens Martin & Miller LLC; Michael E. Dockins

(57) ABSTRACT

A mounting device for housing a smart device having a user interface comprises a horizontal armature, a screen housing, and a mounting bracket. The mounting device is configured for attachment to a display unit having a plurality of posts. The horizontal armature includes coupling mechanisms disposed at each end thereof, wherein each coupling mechanism is configured to be removably coupled to one of the posts. The screen housing has a hollow interior configured to receive the smart device therein, wherein the screen housing includes at least one aperture for providing visual and tactile access to desired portions of the smart device. The mounting bracket is securely coupled to the screen housing and includes at least one projection extending therefrom and configured to be received in a corresponding opening formed in the horizontal armature to couple the screen housing to the horizontal armature.

17 Claims, 3 Drawing Sheets

(56) References Cited

U.S. PATENT DOCUMENTS

| | | | | |
|---|---|---|---|---|
| 7,698,843 B2* | 4/2010 | Hillstrom | G09F 15/0025 | 248/121 |
| 7,802,769 B1* | 9/2010 | Lindsey | A47G 1/205 | 248/475.1 |
| 8,020,821 B2* | 9/2011 | Chen | F16M 11/16 | 248/220.22 |
| 8,264,838 B2* | 9/2012 | Fujikawa | F16M 11/08 | 248/122.1 |
| 8,944,393 B2* | 2/2015 | Mitsuhashi | G09F 7/18 | 248/220.22 |
| 9,010,597 B2* | 4/2015 | Prescott | B60R 7/088 | 224/197 |
| 2003/0057167 A1* | 3/2003 | Johnson | A47F 1/126 | 211/59.3 |
| 2005/0274855 A1* | 12/2005 | Shin | F16M 11/38 | 248/220.22 |
| 2009/0127413 A1* | 5/2009 | Herron, III | A47B 57/42 | 248/220.21 |
| 2009/0223916 A1* | 9/2009 | Kahl | A47F 1/12 | 211/85.4 |
| 2010/0149736 A1* | 6/2010 | Dittmer | F16M 11/10 | 361/679.01 |
| 2010/0200714 A1* | 8/2010 | Persson | F16M 13/02 | 248/220.21 |
| 2010/0276562 A1* | 11/2010 | Nguyen | H04N 5/655 | 248/488 |
| 2011/0155873 A1* | 6/2011 | Montag | B60R 11/02 | 248/218.4 |
| 2011/0234926 A1* | 9/2011 | Smith | F16M 11/10 | 348/836 |
| 2012/0325991 A1* | 12/2012 | Sapper | F16M 11/10 | 248/214 |
| 2013/0107449 A1* | 5/2013 | Su | F16M 11/041 | 361/679.56 |

* cited by examiner

COMPUTER TABLET MOUNTING DEVICE AND ATTACHMENT TO POSTS OF A DISPLAY APPARATUS

CROSS-REFERENCE TO RELATED APPLICATIONS

This application claims priority to U.S. Provisional Application Ser. No. 61/889,576, filed Oct. 11, 2013, the entire disclosure of which is hereby incorporated herein by reference.

FIELD OF THE INVENTION

The present invention relates to a mounting bracket, and more specifically, to a mounting bracket for supporting a tablet or other smart device.

BACKGROUND OF THE INVENTION

It has become increasingly more common to find a photobooth at social events such as weddings, formal parties, and sporting events. Attendees at such events enjoy the ability to use a publically available camera to take photographs that they can later share with their family and friends to commemorate the social occasion.

However, traditional photobooths are often too large and heavy to be easily transported to the site of such events, rendering the use of these types of photobooths exceedingly expensive and inconvenient. As a result, the current trend is to use a photobooth that is designed to be lightweight and collapsible to facilitate simplified transport of the photobooth from one site location to another. Additionally, photobooths have also been transitioning from film based photography to digital photography in line with current trends. The use of digital photography requires that the portable photobooth also be equipped with suitable hardware for taking and storing digital photographs taken through use of the photobooth.

Portable photobooths have therefore been adapted to use small, lightweight hardware devices such as commercially available smart devices for the taking and storing of such photographs. Such smart devices may include tablets having a touch-screen interface and a built-in camera feature, such as the Apple iPad® tablet, for example. Attendees of social events having a portable photobooth may find the use of such popular and well-known smart devices to be advantageous due to their familiarity and ease of use. Such smart devices also commonly include the ability to network with other devices wirelessly, which in turn facilitates the ability of the smart device to share any photographs taken via the photobooth with any compatible social networking services or even other smart devices present at the social event.

One potential problem associated with the use of portable photobooth systems utilizing a smart device may be the increased threat of the smart device being interfered with, damaged, or stolen due to its small size and portability. To prevent the stealing of such equipment, it may be necessary to secure the smart device in a manner that allows the smart device to be accessible while also being difficult to separate from the remainder of the portable photobooth system.

It would therefore be advantageous to provide a mounting device that would allow a smart device such as a tablet to be mounted to a portable photobooth in a manner that prevents the theft of both the smart device and the mounting device when attached to the portable photobooth.

SUMMARY OF THE INVENTION

In accordance with the present invention, a mounting device for securely housing and providing desired access to a smart device having a user interface has surprisingly been discovered.

In an embodiment of the current invention, a mounting device for attachment to a pair of posts and for housing a smart device having a screen is disclosed, the mounting device comprising a horizontal armature having a first coupling mechanism disposed at a first end thereof configured to be removably coupled to one of the posts and a second coupling mechanism disposed at a second end thereof configured to be removably coupled to another one of the posts, a screen housing having a hollow interior configured to receive the smart device therein, wherein the screen housing includes at least one aperture for providing at least one of visual and tactile access to the smart device, and a mounting bracket extending from the screen housing for removably coupling the screen housing to the horizontal armature.

In another embodiment of the invention, a portable display unit for displaying a screen of a smart device is disclosed, the display unit comprising at least one horizontally arranged plate; a plurality of vertically arranged posts disposed about a perimeter of the at least one plate; a horizontal armature having a first end removably coupled to one of the posts and a second end removably coupled to another one of the posts, the horizontal armature having a shape substantially corresponding to a perimeter of the at least one plate, the horizontal armature including a pair of vertically arranged openings formed therethrough; a screen housing having a hollow interior for receiving the smart device therein and an aperture formed in a front surface thereof for displaying the screen of the smart device; and an L-shaped mounting bracket securely coupled to the screen housing, the mounting bracket including a first projection extending therefrom and configured to be received through the first opening to removably couple the screen housing to the horizontal armature.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom.

Figure 1:
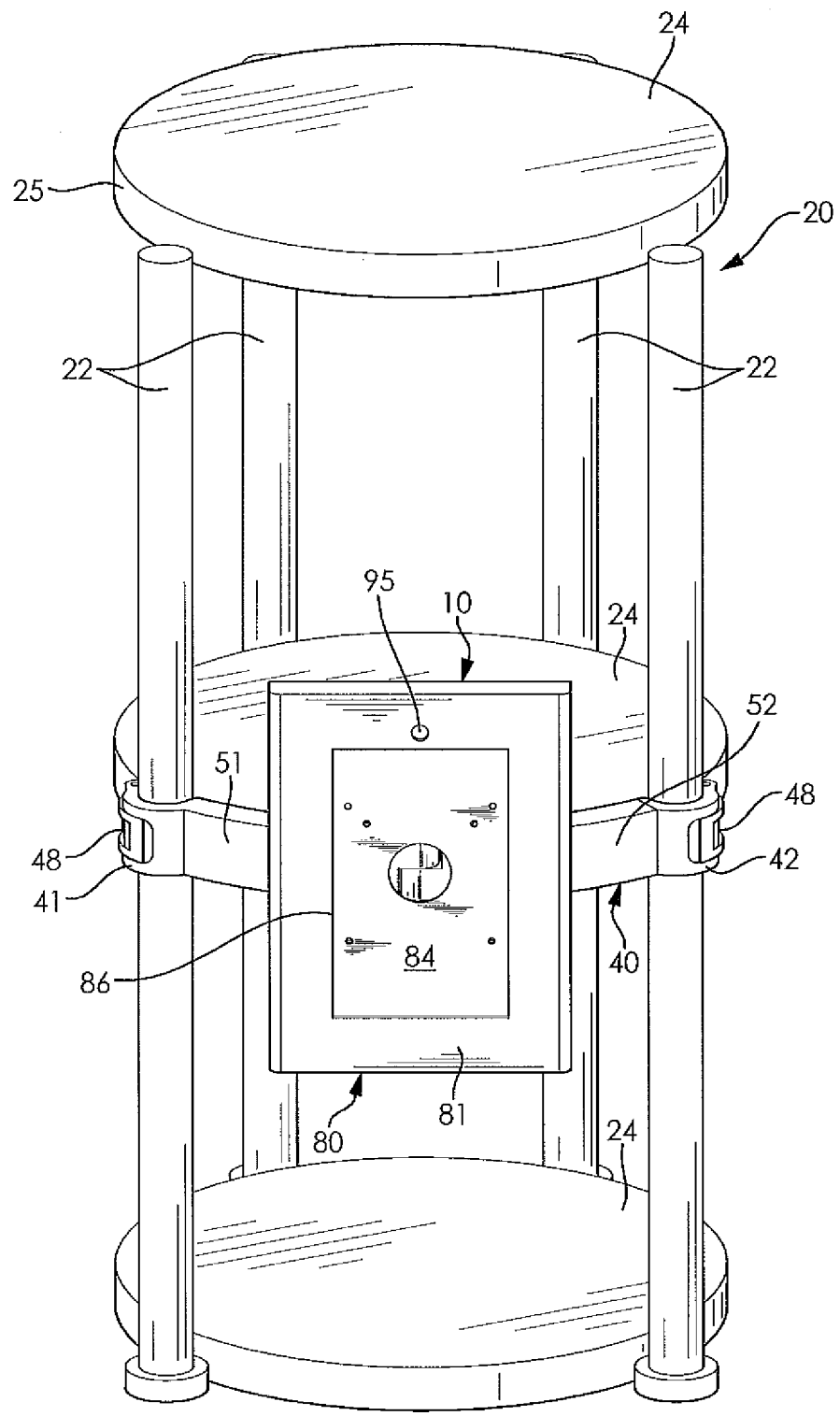
FIG. 1 is a front perspective view of a display unit having a mounting device coupled thereto according to an embodiment of the invention.
Figure 2:
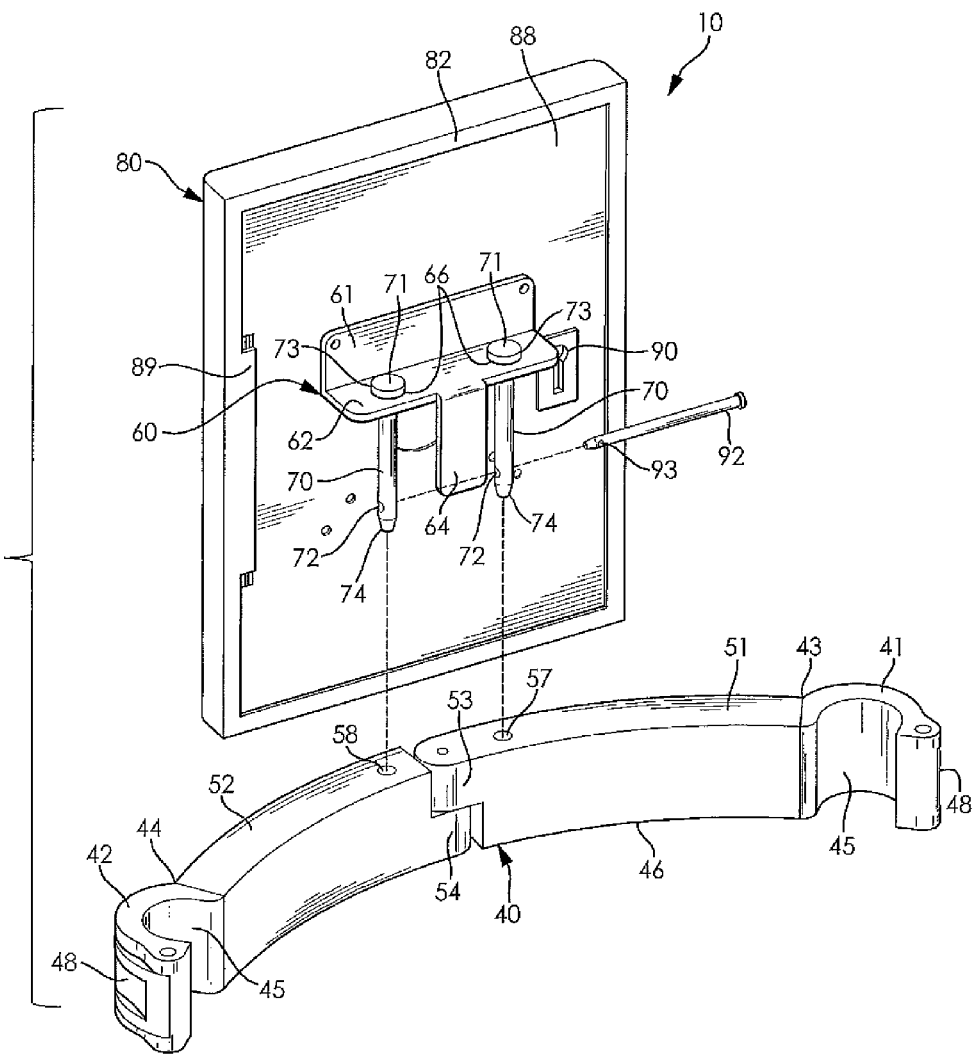
FIG. 2 is a rear perspective view of the mounting device illustrated in FIG. 1.

FIGS. 1 and 2 illustrate an embodiment of a mounting device 10 for use with a display apparatus 20. The mounting device 10 comprises a horizontal armature 40, a mounting bracket 60, and a screen housing 80. The mounting device 10 and the display apparatus 20 may be components of a portable photobooth system, but it should be understood that the mounting device 10 may be used for other related applications without departing from the scope of the present invention. The mounting device 10 is configured to mount a smart device to the display apparatus 20 while maintaining visual access to a screen of the smart device. The term smart device may refer to any portable device having a screen and a user interface. The smart device may for instance be a smart phone, a laptop computer, or a tablet, such as the Apple iPad®, as non-limiting examples. The smart device may include a touch screen display and a forward facing camera, for example. However, it should be understood that any form of suitable smart device or related electronic device may be used without departing from the scope of the present invention.

The display apparatus 20 may comprise a plurality of vertically arranged posts 22 and a plurality of horizontally arranged plates 24 disposed at various heights relative to the posts 22. Each of the plates 24 may have any suitable shape, including a circular shape, a rectangular shape, a triangular shape, or an elliptical shape, as non-limiting examples. The posts 22 may be arranged about a perimeter 25 of each of the plates 24. In some embodiments, the posts 22 may be equally spaced apart about the perimeter 25 of each of the plates 24, but other spacing arrangements may be used without departing from the scope of the present invention. The display apparatus 20 may include one of the plates 24 forming a base thereof and another one of the plates 24 forming at a top surface thereof. If additional plates 24 are used to form the display apparatus 20, the plates 24 may be spaced apart from one another vertically between the base and the top surface of the display apparatus 20. The plates 24 disposed between the base and the top surface may act as shelves for storing items associated with the display apparatus 20, for example.

The posts 22 may have any suitable cross-sectional shape, including rectangular, circular, elliptical, or bullet-shaped, for example. The posts 22 may include a feature (not shown) allowing the posts 22 to be collapsible to reduce a size of the display apparatus 20 during transport thereof. The posts 22 may for instance include a telescoping feature to reduce a length of each of the posts 22 during transport. Other collapsible features, such as foldable posts 22 having hinged joints for folding the posts 22, may also be used, as desired. The posts 22 may also include a means for accepting and securing panels (not shown) or other coverings (not shown) to cover some or all of the display unit 20, as desired.

The horizontal armature 40 is configured to extend between two of the posts 22 to support the mounting bracket 60 and the screen housing 80. Accordingly, a shape and size of the horizontal armature 40 may be dependent on the shape and size of the plates 24 and a configuration of the posts 22, including a spacing of the posts 22 about the perimeter 25 of each of the plates 24. The mounting device 10 is shown in FIGS. 1 and 2 as being configured for mounting on a display apparatus 20 having circular plates 24 and posts 22 arranged annularly about the perimeter 25 of the circular plates 24. Accordingly, a body 46 of the horizontal armature 40 illustrated in FIGS. 1 and 2 has a substantially arcuate shape corresponding to the circular shape of the perimeter 25 of the plates 24. Because the horizontal armature 40 extends between posts 22 forming an annular array about the circular plates 24, the body 46 of the horizontal armature 40 may have a radius of curvature that is slightly greater than a radius of curvature of the perimeter 25 of the circular plates 24 to cause the horizontal armature 40 to extend at least partially beyond the perimeter 25 of the circular plates 24. It should be understood that the body 46 of the horizontal armature 40 may have a different shape depending on the shape of the plates 24 and the arrangement of the posts 22 thereabout. The body 46 may for instance have a linear shape if the plates 24 are rectangular in shape, for example.

The horizontal armature 40 includes a first coupling mechanism 41 disposed at a first end 43 of the body 46 and a second coupling mechanism 42 disposed at a second end 44 of the body 46. The first coupling mechanism 41 and the second coupling mechanism 42 are each configured to removably couple the mounting device 10 to the display apparatus 20. The first coupling mechanism 41 and the second coupling mechanism 42 each include a channel 45 formed therein. Each of the channels 45 may be shaped to at least partially correspond to an outer surface of the posts 22 of the display apparatus 20. For example, the channels 45 may have a substantially semi-circular or bullet-shaped cross-sectional shape if a circular post 22 is used. Alternatively, the channels 45 may have a substantially rectangular cross-sectional shape if rectangular or square posts 22 are used. It should be understood that the channels 45 formed in the coupling mechanisms 41, 42 may in some cases be sized to be slightly smaller than the outer surface of the posts 22 to facilitate a snug connection or a snap-fit type connection, for example.

Each of the channels 45 may also be coated or lined with a layer of rubber (not shown or another suitable material (not shown) configured to increase friction between each of the coupling mechanisms 41, 42 and the posts 22 to which they are coupled. Alternatively, each of the coupling mechanisms 41, 42 may be formed from rubber or a similar material and may subsequently be coupled to the remainder of the horizontal armature 40 at each end 43, 44 thereof. The rubber coating may also act as a form of padding that allows the first coupling mechanism 41 and the second coupling mechanism 42 to be removably coupled to the display apparatus 20 numerous times without risking damage to the mounting device 10 or the posts 22.

Each of the coupling mechanisms 41, 42 may further include an adjustable coupling feature 48. The adjustable coupling feature 48 may be any feature configured to increase the frictional force between each of the coupling mechanisms 41, 42 and the posts 22 when the coupling feature 48 is engaged. The adjustable coupling feature 48 may for instance be an eccentric cam lever, a clamp, or a set screw, as non-limiting examples. Each of the adjustable coupling features 48 may include at least a portion thereof configured to extend into one of the channels 45 to engage the post 22 and to increase the frictional forces therebetween. Alternatively, each of the adjustable coupling features 48 may be configured to decrease a cross-sectional area of the channels 45 to tighten a grip of each of the coupling mechanisms 41, 42 about the posts 22.

The body 46 of the horizontal armature 40 may be formed from a one-piece construction or may include multiple segments coupled to each other. Referring to FIG. 2, the body 46 is formed from a two-piece construction including a first body segment 51 and a second body segment 52, wherein the first body segment 51 meets and is coupled to the second body segment 52 at or adjacent a mid-point of the body 46.

The first body segment 51 may include a first hinge element 53 formed at an interior end thereof opposite the first coupling mechanism 41 and the second body segment 52 may include a second hinge element 54 formed at an interior end thereof opposite the second coupling mechanism 42. The first hinge element 53 and the second hinge element 54 are configured to cooperate with each other to form a rotatable connection therebetween. The first hinge element 53 is shown in FIG. 2 as a projection extending from an upper half of the first body segment 51 and the second hinge element 54 is shown as a projection extending from a lower half of the second body element 52. One or both of the first hinge element 53 and the second hinge element 54 may include an aperture (not shown) formed therein for receiving a shaft or rod about which the first hinge element 53 and the second hinge element 54 may rotate. In some embodiments, only one of the first hinge element 53 and the second hinge element 54 includes an aperture formed therein and the other of the first hinge element 53 and the second hinge element 54 includes a cylindrical projecting portion (not shown) that extends through the aperture formed in the other hinge element 53, 54 to rotatably and hingedly couple the first hinge element 53 to the second hinge element 54. However, any known hinge arrangement may be used to couple the first body segment 51 to the second body segment 52, as desired. Additionally, it should be understood that the body 46 of the horizontal armature 40 may include three of more segments and two or more hinged portions, as desired, to further increase the flexibility and collapsibility of the horizontal armature 40.

The first body segment 51 may include a vertically arranged first opening 57 formed adjacent and spaced apart from the first hinge element 53 and the second body segment 52 may include a vertically arranged second opening 58 formed adjacent and spaced apart from the second hinge element 54. Each of the first opening 57 and the second opening 58 may be substantially equally spaced from the hinged connection formed between the first hinge element 53 and the second hinge element 54. The first opening 57 and the second opening 58 may extend partially or entirely through the first body segment 51 and the second body segment 52, respectively, as desired. If a one-piece construction is used to form the body 46 of the horizontal armature 40, the first opening 57 and the second opening 58 may be equally spaced apart from the mid-point of the body 46, for example. However, other spacing arrangements of the first opening 57 and the second opening 58 may be used, as desired, including non-symmetric arrangements.

The mounting bracket 60 is configured to couple the screen housing 80 to the horizontal armature 40. The mounting bracket 60 may include a first planar portion 61 and a second planar portion 62, wherein the second planar portion 62 extends in a perpendicular direction relative to the first planar portion 61, causing the mounting bracket 60 to be substantially L-shaped. The mounting bracket 60 may be formed from a bent piece of sheet metal or separately-formed pieces of metal soldered, welded, or otherwise jointed together, for example. The first planar portion 61 abuts a rear surface 82 of the screen housing 80 and may be securely coupled thereto by traditional coupling means, such as welding or threaded fasteners, for example.

The second planar portion 62 of the mounting bracket 60 extends away from the rear surface 82 of the screen housing 80 in a perpendicular direction and may include a pair of holes 66 formed therethrough. The holes 66 are spaced apart from each other and sized to substantially correspond to the first opening 57 and the second opening 58 formed in the horizontal armature 40 when the first body segment 51 and the second body segment 52 are rotated to a predetermined position. The predetermined position may be a position of the first body segment 53 and the second body segment 54 when the first coupling mechanism 41 and the second coupling mechanism 42 are respectively coupled to two of the posts 22 of the display apparatus 20.

When the first opening 57 and the second opening 58 are aligned with the holes 66 formed in the second planar portion 62, a pair of projections 70 may be received through the openings 57, 58 and the pair of holes 66 to couple the mounting bracket 60 to the horizontal armature 40. Each of the projections 70 may be cylindrical in shape and include a head 71 formed at a first end 73 thereof. The head 71 of each of the projections 70 has an outer diameter greater than an inner diameter of the holes 66 formed in the second planar portion 62 to prevent the head 71 of each of the projections 70 from passing therethrough.

In some embodiments, the projections 70 may be securely coupled to the second portion 62 of the mounting bracket 60 to form a unitary structure. The head 71 of each of the projections 70 may abut an upper surface of the second planar portion 62 and each of the projections 70 may be securely coupled to the mounting bracket 60 by any know coupling means, including welding or brazing, for example. Accordingly, a second end 74 of each of the projections 70 may extend away from the second planar portion 62 of the mounting bracket 60 in a direction parallel to and opposite a direction the first planar portion 61 extends away from the second planar portion 62.

Each of the projections 70 may further include a locking aperture 72 formed adjacent the second end 74 thereof. The locking apertures 72 may be formed in a direction transverse to a longitudinal axis of each of the projections 70. In some embodiments, one or both of the locking apertures 72 may include a threaded interior surface. Each of the locking apertures 72 are configured to receive a locking device 92 therein to prevent the second end 74 of each of the projections 70 from passing through the openings 57, 58 formed in the horizontal armature 40 when the mounting bracket 60 is coupled thereto. The locking device 92 may be a clevis pin, as shown in FIG. 2, or a pad-lock, for example, but any suitable form of locking device may be used, as desired. If the clevis pin is used, a portion of an outer surface of the clevis pin may be threaded to cooperate with the threaded portion of the inner surface of one or both of the locking apertures 72, as desired. Additionally, the clevis pin may also include a through-hole 93 formed therein for receiving another locking device, such as a pad-lock, to further prevent removal of the clevis pin from the pair of the locking apertures 72.

The second planar portion 62 of the mounting bracket 60 may also include a substantially planar protrusion 64 extending from a free end thereof and extending downward in a direction parallel to the first planar portion 61 of the mounting bracket 60. The protrusion 64 may be rectangular in shape and may be spaced apart from the rear surface 82 of the screen housing 80 by a distance substantially corresponding to a width of the horizontal armature 40. The horizontal armature 40 may therefore be sandwiched between the rear surface 82 of the screen housing 80 and the protrusion 64 when the projections 70 are received in the openings 57, 58 and the holes 66, thereby preventing the mounting bracket 60 and the screen housing 80 from rotating relative to the horizontal armature 40.

The screen housing 80 is configured to house a smart device such as a tablet therein. The screen housing 80 includes a hollow interior 84 having a size and shape suitable for receiving the smart device therein. In some embodiments, the screen housing 80 may include an access panel 88 for receiving the smart device. The access panel 88 may form an entirety or a portion of the rear surface 82 of the screen housing 80, but it should be understood that the access panel 88 may be formed on any portion of the screen housing 80 while remaining within the scope of the present invention. The access panel 88 may be a door having a suitable size and shape for positioning the smart device within the hollow interior 84 of the screen housing 80. The access panel 88 may include a hinge 89 formed at one end thereof and a locking mechanism 90 formed at an opposite end thereof. The hinge 89 rotatably couples the access panel 88 to the remainder of the screen housing 80. The locking mechanism 90 may for instance be a lock and key system (not shown) or an external system such as a padlock (not shown) having a shackle fed through an aperture (not shown) formed in the access panel 88 and an aperture (not shown) formed in the remainder of the screen housing 80. It should be understood, however, that any known locking system suitable for use with the screen housing 80 may be used without departing from the scope of the present invention. It should be understood that the first planar portion 61 of the mounting bracket 60 may be coupled to the access panel 88 of the screen housing 80, causing the mounting bracket 60 to rotate with the access panel 88 when the access panel 88 is opened to receive the smart device therein.

In other embodiments, the screen housing 80 may include an open end (not shown) having a cross-sectional shape and size for receiving the smart device into the hollow interior 84 of the screen housing 80. The screen housing 80 may include a locking device (not shown) for securing the smart device within the hollow interior 84 of the screen housing 80 after the smart device has been inserted into the screen housing 80 through the open end thereof. The locking device may for instance be a component fed through apertures (not shown) formed in each of a front surface 81 and the rear surface 82 of the screen housing 80 to restrict the smart device from being removed therefrom. For example, the apertures may be formed adjacent the open end of the screen housing 80, as desired.

The front surface 81 of the screen housing 80 may include a cut-out (aperture) 86 formed therein having a size and shape that substantially corresponds to a size and shape of a screen formed on the smart device. The front surface 81 of the screen housing 80 may also include one or more additional apertures 95 formed therein and configured to allow access to other features of the smart device. For instance, one of the apertures 95 may allow a forward facing camera formed on the smart device to have visual access to an exterior of the screen housing 80. The apertures 95 may also be sized and positioned to allow certain indicia, lenses, or other interactive features formed on the smart device to be accessed from an exterior of the screen housing 80, for example. The size and position of the cut-out 86 and any of the apertures 95 formed in the screen housing 80 may also be selected to restrict access of a user to certain features of the smart device. For example, the on/off switch for the smart device may be covered by the screen housing 80 to prevent the smart device from being prematurely turned on or off while the smart device is accessible to users of the mounting device 10.

In use, the smart device is first placed into the hollow interior 84 of the screen housing 80 via the access panel 88 or the open end thereof. The smart device is disposed in the screen housing 80 in a manner that allows a screen of the smart device to be both seen and touched through the cut-out 86 formed in the front surface 81 of the screen housing 80. The smart device may also be positioned within the screen housing 80 in a manner that allows other features of the smart device to be accessible or inaccessible to a user of the mounting device 10. For example, a forward facing camera of the smart device may be exposed by one of the apertures 95 while an on/off switch or button of the smart device may be covered to prevent a user from operating the smart device in a manner not intended for use with the mounting device 10. The locking mechanism 90 may then be used to further secure the smart device from undesired use or theft.

Next, the mounting device 10 is coupled to the display apparatus 20. The channel 45 formed in the first coupling mechanism 41 receives one of the posts 22 therein and the channel 45 formed in the second coupling mechanism 42 receives another one of the posts 22 therein. The first body segment 51 and the second body segment 52 may be rotated relative to each other about the hinged connection formed between the first hinge element 53 and the second hinge element 54 to properly position the first coupling mechanism 41 and the second coupling mechanism 42 for coupling to the posts 22. The adjustable coupling feature 48 of each of the first coupling mechanism 41 and the second coupling mechanism 42 may then be adjusted to increase the frictional force between the coupling mechanisms 41, 42 and the posts 22 to maintain the horizontal armature 40 in a desired position relative to the ground surface.

Once the horizontal armature 40 is securely coupled to the posts 22, the mounting bracket 60 having the screen housing 80 coupled thereto is placed over the horizontal armature 40. A gap formed between the rear surface 82 of the screen housing 80 and the protrusion 64 extending from the mounting bracket 60 receives a central portion of the horizontal armature 40 therein. As described hereinabove, the first opening 57 and the second opening 58 of the horizontal armature 40 are in a position to be aligned with the pair of holes 66 formed in the mounting bracket 60 when the horizontal armature 40 is properly coupled to two of the posts 22. Additionally, in the case of the curved horizontal armature 40 shown in FIGS. 1 and 2, the first body segment 51 and the second body segment 52 may be positioned relative to each other in a manner causing the horizontal armature 40 to have an arcuate shape with a substantially constant radius of curvature corresponding to the circular shape of the plates 24 forming the display apparatus 20.

Once properly aligned, the projections 70 may then be inserted through the first opening 57 and the second opening 58. If the projections 70 are presented as distinct components separate from the remainder of the mounting bracket 60, the projections 70 are inserted through both the holes 66 formed in the mounting bracket 60 and the first opening 57 and the second opening 58. Alternatively, if the projections 70 are formed as a unitary structure with the remainder of the mounting bracket 60, the projections 70 are inserted through only the first opening 57 and the second opening 58. The projections 70, the rear surface 82 of the screen housing 80, and the protrusion 64 may then cooperate with each other to constrain the horizontal armature 40 to its installed position to militate against instability or rotation of the screen housing 80 when the smart device housed therein is in use. The locking device 92, such as the clevis pin or the padlock, may then be fed through the locking apertures 72 formed adjacent the second end 74 of each of the projections 70 to securely couple the mounting bracket 60 to the horizontal armature 40.

The ability of the mounting device 10 to be easily and quickly assembled and disassembled allows the mounting device 10 to be used as a part of a portable display structure, such as a portable photobooth. The rotatable connection formed within the horizontal armature 40 allows the horizontal armature 40 to be collapsible, causing the horizontal armature 40 to have a smaller packaging size during transport of the portable photobooth. The first coupling mechanism 41 and the second coupling mechanism 42 of the horizontal armature 40 allows for the mounting device 10 to be mounted to a variety of different support structures, such as the display unit 20 described hereinabove. The screen housing 80 advantageously permits only selected portions of the smart device housed therein to be interacted with during use, thereby preventing unauthorized use and potentially even theft of the smart device. Additionally, the removable coupling and locking of the mounting bracket 60 to the horizontal armature 40 further prevents theft of the smart device when retained within the screen housing 80 by allowing only authorized personnel to disassemble the mounting device 10. For all of the foregoing reasons, the mounting device 10 forms a valuable component of any portable structure utilizing a smart device that is accessible to multiple users and potentially otherwise susceptible to theft or improper use.

Figure 3:
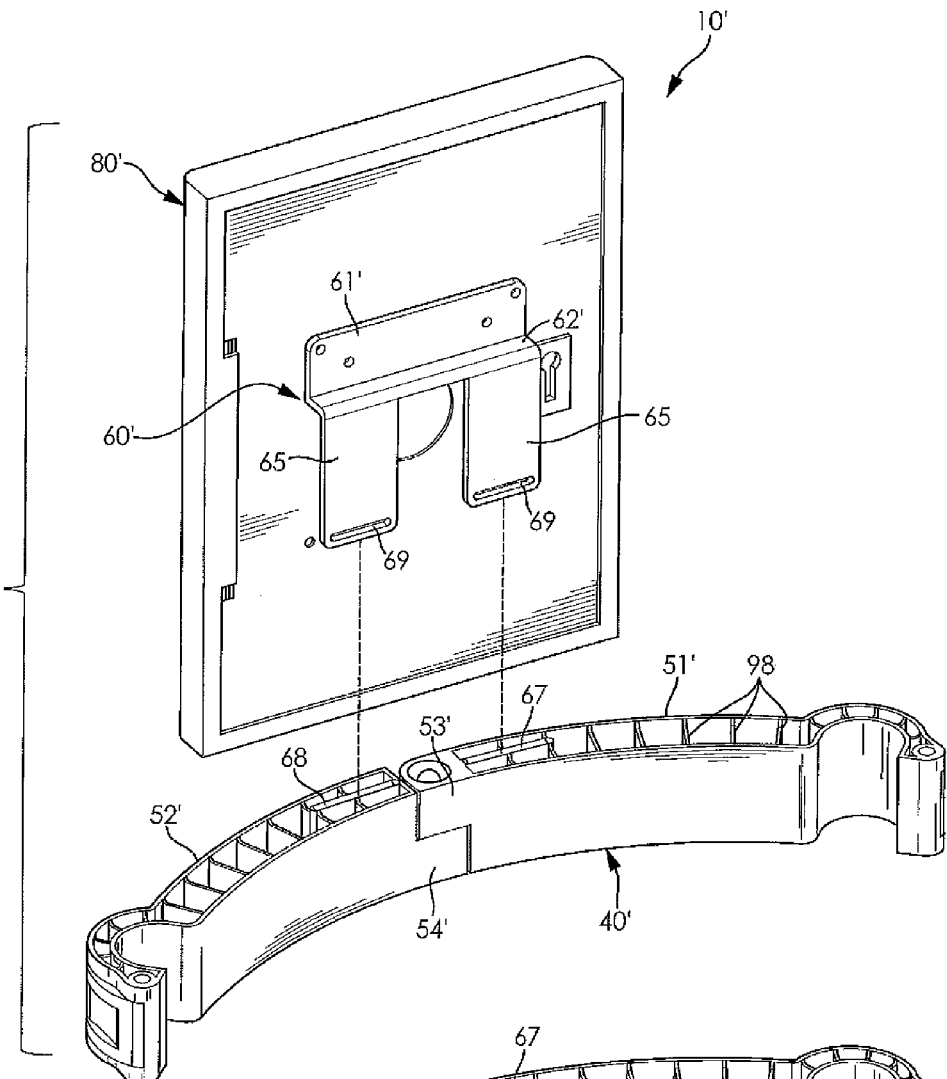
FIG. 3 is a rear perspective view of a mounting device according to another embodiment of the invention.

FIG. 3 illustrates a mounting device 10' according to another embodiment of the invention. Structure similar to that illustrated in FIGS. 1 and 2 includes the same reference numeral and a prime (') symbol for clarity. The modified mounting device 10' similarly includes a horizontal armature 40', a mounting bracket 60', and a screen housing 80'.

The mounting device 10' primarily differs from the mounting device 10 in the manner in which the mounting bracket 60' is coupled to the horizontal armature 40'. The mounting bracket 60' includes a first planar portion 61' coupled to the screen housing 80' and a second planar portion 62' that is shortened relative to the second planar portion 62 of the mounting bracket 60. A free end of the second planar portion 62' includes at least one projection 65 extending therefrom in a downward direction and in a direction parallel to the first planar portion 61'. The second planar portion 62' is shown in FIG. 3 as having a pair of the downwardly extending projections 65, but it should be understood that one of the projections 65 or three or more of the projections 65 may be used while remaining within the scope of the present invention. Each of the projections 65 may be substantially rectangular in shape and may also have a substantially rectangular cross-section, wherein the cross-section of each of the projections 65 may include one elongated side and one narrow side. Each of the projections 65 may further include a locking aperture 69 formed at a distal end thereof. Each of the locking apertures 69 may be spaced apart from the second planar portion 62' of the mounting bracket 60' by a distance at least as great as a height of the horizontal armature 40'.

The horizontal armature 40' may be formed from a one piece construction or a two piece construction, as desired. The horizontal armature 40' illustrated in FIG. 3 is formed from a two piece construction including a first body segment 51' and a second body segment 52'. The first body segment 51' is rotatably coupled to the second body segment 52' by a hinged connection including a first hinge element 53' and a second hinge element 54'. The first body segment 51' includes a first opening 67 formed therein and the second body opening 52' includes a second-opening 68 therein adjacent the hinged connection. Each of the first opening 67 and the second opening 68 may have a substantially rectangular cross-section substantially corresponding to a cross-section of each of the projections 65 extending from the mounting bracket 60'. The horizontal armature 40' may be formed to have a substantially hollow interior formed between the two major faces thereof, wherein the major faces are connected to each other by a plurality of connecting ribs 98 spaced apart from each other.

The use of the ribs 98 allows a weight of the horizontal armature 40' to be reduced while allowing the horizontal armature 40' to remain structurally sound and capable of supporting the weight of the screen housing 80'. As illustrated in FIG. 3, the first opening 67 and the second opening 68 may resemble sheaths or sleeves suspended between the major faces of the horizontal armature 40' by connection to the plurality of ribs 98. However, it should be understood that the horizontal armature 40' may be formed from a substantially solid construction, as desired.

Figure 4:
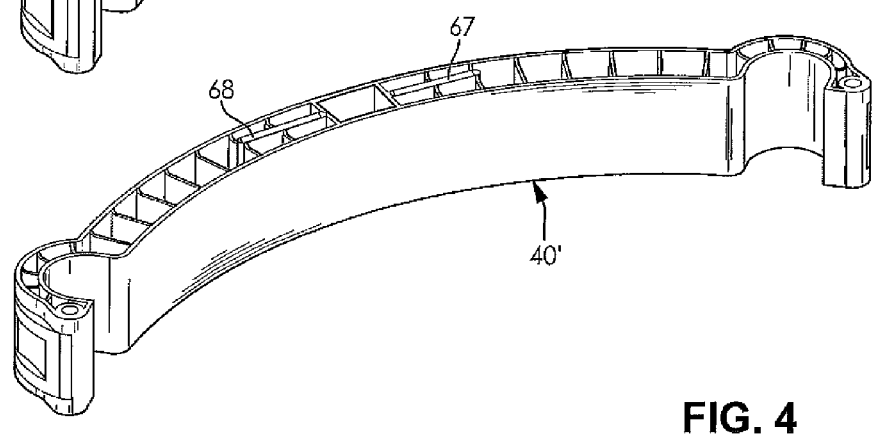
FIG. 4 is a rear perspective view of a horizontal armature according to another embodiment of the invention.

FIG. 4 illustrates the horizontal armature 40' when formed from a one-piece construction devoid of the hinged connection formed intermediate the first opening 67 and the second opening 68. Accordingly, the first opening 67 and the second opening 68 of the horizontal armature 40' are formed therein to be normally aligned with the projections 65 extending from the mounting bracket 60' illustrated in FIG. 3.

In use, the horizontal armature 40' illustrated in FIG. 3 is first rotated to a position wherein the first opening 67 and the second opening 68 formed therein are aligned with each of the projections 65 extending from the mounting bracket 60'. If the horizontal armature 40' formed from the one-piece construction illustrated in FIG. 4 is used, the first opening 67 and the second opening 68 are already spaced apart and arranged to correspond to the projections 65 of the mounting bracket 60'. In either case, the pair of projections 65 are inserted into the first opening 67 and the second opening 68 in a manner wherein the free end of each of the projections 65 having the locking aperture 69 formed therein may extend through the first opening 67 and the second opening 68 to allow the locking apertures 69 to be exposed on an opposite side of the horizontal armature 40'. Once the projections 65 are inserted and the locking apertures 69 are exposed, a locking device (not shown) such as a pad lock may be inserted through one or both of the locking apertures 69 to prevent the projections 65 from being removed from the first opening 67 and the second opening 68.

The cross-sectional shape of both the projections 65 and the openings 67, 68 beneficially militate against the screen housing 80' rotating relative to the horizontal armature 40' when installed thereon due to the projections 65 being largely constrained from rotational movement within the openings 67, 68, removing the need for the protrusion 64 of the mounting device 10 illustrated in FIGS. 1 and 2, which similarly restricted rotational movement of the screen housing 80 relative to the horizontal armature 40. Additionally, the projections 65 further aid in securing the first body segment 51' and the second body segment 52' in the position for mounting the screen housing 80' to the horizontal armature 40', thereby adding stability to the mounting device 10' while in use.

It should further be understood that the one-piece construction of the horizontal armature 40' may not require the use of a pair of the projections 65 in conjunction with a first opening 67 and a second opening 68. The substantially rectangular cross-sectional shape of both the projections 65 and the openings 67, 68 may allow for a single one of the projections 65 to be inserted into one of the openings 67, 68 to constrain rotational movement of the screen housing 80' relative to the horizontal armature 40'. This occurs because the projection 65 having the rectangular cross-sectional shape cannot rotate freely within one of the openings 67, 68, in contrast to a substantially cylindrical projection inserted into a substantially cylindrical opening.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A mounting device for attachment to a pair of posts and for housing a smart device having a screen, the mounting device comprising:
a horizontal armature formed from a first body segment and a second body segment, the first body segment having a first coupling mechanism disposed at a first end thereof configured to be removably coupled to one of the posts and the second body segment having a second coupling mechanism disposed at a first end thereof configured to be removably coupled to another one of the posts, wherein a second end of the first body segment is rotatably coupled to a second end of the second body segment;
a screen housing having a hollow interior configured to receive the smart device therein, wherein the screen housing includes at least one aperture for providing at least one of visual and tactile access to the hollow interior; and
a mounting bracket extending from the screen housing for removably coupling the screen housing to the horizontal armature.

2. The mounting device according to claim 1, wherein the first coupling mechanism and the second coupling mechanism each include a channel formed therein for receiving one of the posts.

3. The mounting device according to claim 1, wherein the first coupling mechanism and the second coupling mechanism each include an adjustable coupling feature for securely coupling the horizontal armature to the posts by increasing a frictional force therebetween.

4. The mounting device according to claim 1, wherein the mounting bracket includes a first projection extending therefrom.

5. The mounting device according to claim 4, wherein the first body segment of the horizontal armature includes a first opening formed therein for removably receiving the first projection of the mounting bracket therein to removably couple the screen housing to the horizontal armature.

6. The mounting device according to claim 5, wherein a first end of the first projection includes a locking aperture formed therethrough for receiving a locking device, wherein the locking aperture of the first projection is exposed for receiving the locking device when the first projection is fully inserted into the first opening of the first body segment of the horizontal armature.

7. The mounting device according to claim 5, wherein the mounting bracket includes a second projection extending therefrom and the second body segment of the horizontal armature includes a second opening formed therethough, wherein the second projection is removably received through the second opening.

8. The mounting device according to claim 5, wherein each of the first projection and the first opening have a cross-sectional shape elongated in one direction to prevent rotation of the first projection within the first opening when received therein.

9. The mounting device according to claim 5, wherein the mounting bracket includes a first planar portion securely coupled to the screen housing and a second planar portion extending from the first planar portion in a perpendicular direction; wherein a protrusion extends from a free end of the second planar portion and is spaced apart from the screen housing by a distance substantially corresponding to a width of the horizontal armature.

10. The mounting device according to claim 1, wherein the screen housing includes an access panel rotatably coupled thereto.

11. The mounting device according to claim 10, wherein the access panel includes a hinge disposed at a first end thereof and a locking mechanism disposed at a second end thereof.

12. The mounting device according to claim 1, wherein the at least one aperture of the screen housing is positioned to allow a forward facing camera of the smart device to have visual access to an exterior of the screen housing when the smart device is disposed within the hollow interior.

13. The mounting device according to claim 1, wherein the horizontal armature is arcuate in shape as it extends from the first end thereof to the second end thereof.

14. The display unit according to claim 1, wherein the first body segment is rotatably coupled to the second body segment by a hinge element having an axis of rotation arranged perpendicular to a longitudinal dimension of each of the first body segment and the second body segment.

15. A portable display unit for displaying a screen of a smart device, the display unit comprising:
at least one horizontally arranged plate;
a plurality of vertically arranged posts disposed about a perimeter of the at least one plate;
a horizontal armature formed from a first body segment rotatably coupled to a second body segment, the first body segment removably coupled to one of the posts and the second body segment removably coupled to another one of the posts, the first body segment of the horizontal armature including a first opening formed therethrough;
a screen housing having a hollow interior for receiving the smart device therein and an aperture formed in a front surface thereof; and
a mounting bracket securely coupled to the screen housing, the mounting bracket including a first projection extending therefrom, the first projection configured to be received through the first opening to removably couple the screen housing to the horizontal armature.

16. The display unit according to claim 15, wherein the mounting bracket includes a second projection extending therefrom and a second opening is formed in the second body segment, wherein the first opening and the second opening are spaced apart to correspond to the first projection and the second projection when the first body segment is rotated relative to the second body segment to a predetermined position.

17. The display unit according to claim 15, wherein a first end of the first projection includes a locking aperture formed therein for receiving a locking device to lock the mounting bracket to the horizontal armature.

* * * * *